(No Model.)

R. MIEHLE.
DRIVING MECHANISM FOR VELOCIPEDES.

No. 547,612. Patented Oct. 8, 1895.

Witnesses.

Inventor.
Robert Miehle
by Elliott & Hopkins
Att'ys

UNITED STATES PATENT OFFICE.

ROBERT MIEHLE, OF CHICAGO, ILLINOIS.

DRIVING MECHANISM FOR VELOCIPEDES.

SPECIFICATION forming part of Letters Patent No. 547,612, dated October 8, 1895.

Application filed September 20, 1894. Serial No. 523,590. (No model.)

*To all whom it may concern:*

Be it known that I, ROBERT MIEHLE, a citizen of the United States, residing at Chicago, in the county of Cook and State of Illinois, have invented certain new and useful Improvements in Driving Mechanism for Velocipedes and other Machinery, of which the following is a full, clear, and exact specification.

My invention relates to driving mechanism for that class of velocipedes and other forms of machinery in which the propelling power is applied through the intermediary of a revolving crank, and more particularly to the class in which the power is transmitted from the crank-shaft to the driving-wheel by means of gearing, one of whose members is elliptical.

The invention has for its especial purpose to improve the pedal movement and to afford more advantageous propelling leverage for the rider of velocipedes. The circular movement of the pedal beyond being objectionable to many riders, because of the great extent of lateral movement the foot is caused to travel, is further objectionable because of the loss of leverage during periods when the pedal is rising and passing beyond dead-center, and when the elliptical sprocket is used the lateral or to-and-fro movement during rapid riding, when the minor diameter of the sprocket is in engagement with the chain, is so rapid that it is difficult for the rider to keep his pedals. A strictly up-and-down movement, however, such as that produced by an ordinary oscillating lever, is not desirable, as it is an unnatural movement for the foot, it being unlike the motion of the foot in walking, and hence a more or less back-and-forth movement combined with the up-and-down movement is preferable.

My invention is designed to overcome these defects; and to this end it has for its primary object to provide improved means for causing the pedals to travel in an orbit whose lateral axis or diameter is shorter than its upright or vertical axis or diameter.

A further object of my invention is to cause the pedals to pass the dead-center of their stroke at about the time the minor diameter of the sprocket comes into engagement with the chain or other means of connection between such sprocket-gear and the driving-wheel, whereby the rapid movement of such sprocket produced by the driving-wheel acting thereon will be offset by the slow movement of the pedals at such times.

With these ends in view my invention consists in certain features of novelty described herein with reference to the accompanying drawings, and more particularly pointed out in the claims.

Figure 1:
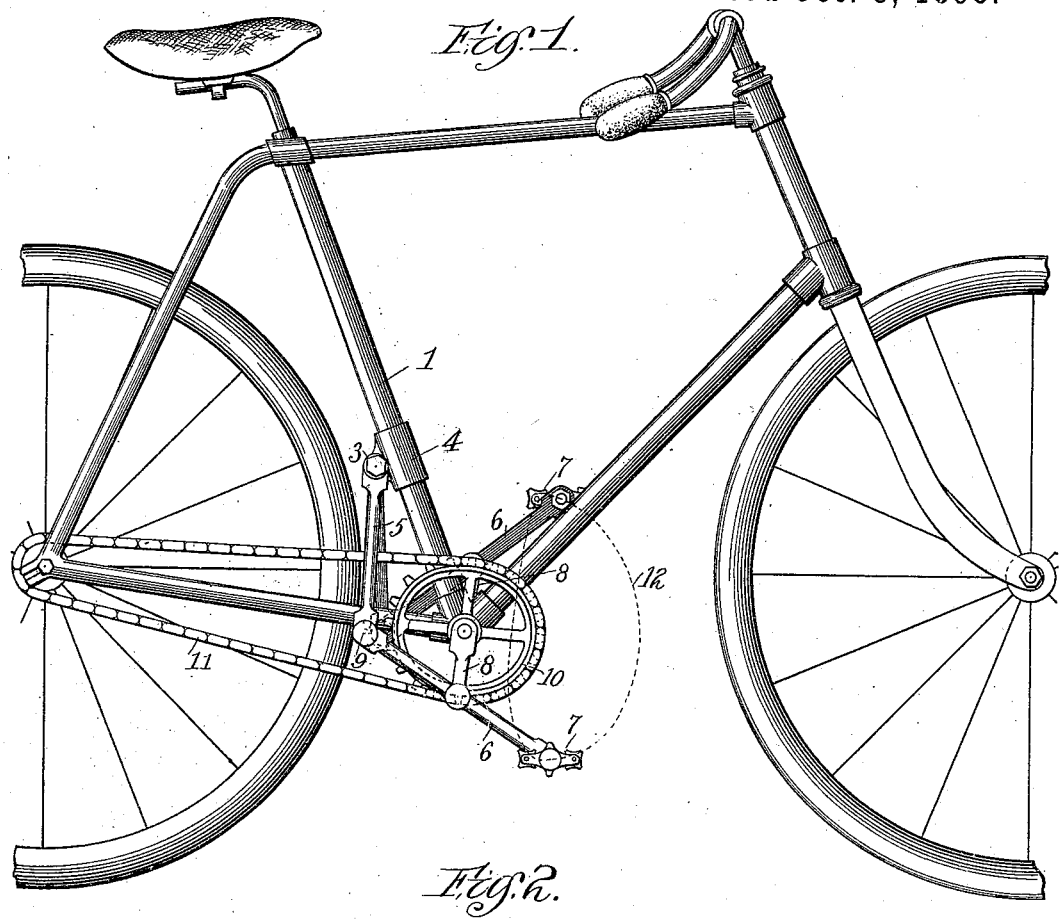
Figure 2:
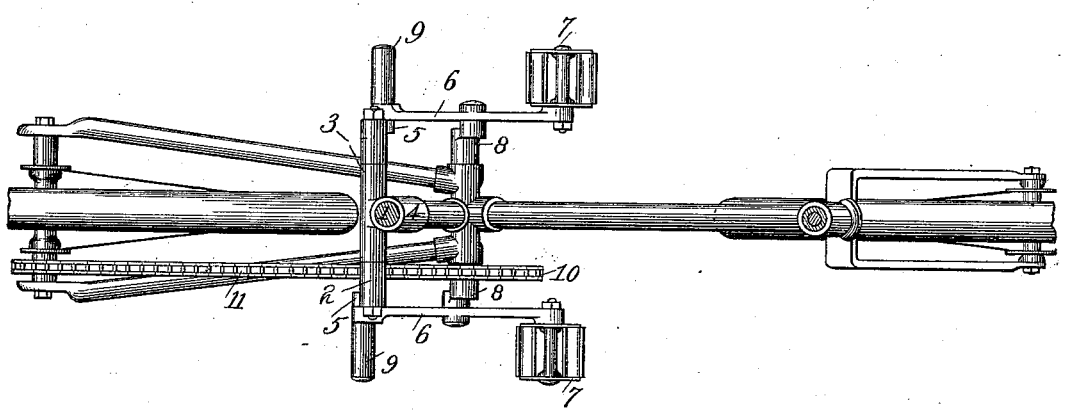

In the said drawings, Figure 1 is a side elevation of an ordinary bicycle or velocipede provided with my improvements; and Fig. 2 is a plan view thereof, portions of the frame and the parts carried thereby above the driving mechanism being omitted.

To attain the said objects of my invention I apply the power to the crank through the medium of a driving-lever having a floating or shifting pivot, and when the elliptical sprocket or gear is used I arrange the crank on the short or minor diameter of the ellipse, the pedal being carried by the free end of the lever and the crank being pivoted to the latter at a point between the pedal and the said shifting or floating pivot.

My invention is shown in the drawings as applied to the ordinary chain-geared bicycle; but it will of course be understood that this is but an example of the many forms of foot-propelled vehicles or pedal machinery generally to which my improvements might be applied. In the example shown, upon the saddle-post or center brace 1 of the bicycle-frame is supported a horizontal shaft 2 by any suitable means, such as a bearing-sleeve 3, secured to a two-part clamping-sleeve or collar 4, embracing the saddle-post 1, and being adjustably clamped or otherwise secured to or formed on such post; but it is preferably clamped thereto in order that my improvements may be applied to any bicycle and readily adjusted to suit the varying conditions. To each end of the shaft 2 is pivoted a swinging link or support 5, to the lower end of which is pivoted the rear end of the aforesaid driving-lever 6, whose free end carries the pedal 7.

8 represents the cranks of the usual construction secured to the ordinary crank-shaft and being pivoted, respectively, to the levers 6 between the shifting or floating pivots 9 of such levers and the pedals 7, and 10 represents the sprocket-gear, which is elliptical, and on the minor diameter of which the cranks 8 are arranged, the gear 10 being connected to the driving-wheel by sprocket-chain 11 in the ordinary manner. By the employment of the lever 6, having the floating or shifting pivot 9 and being pivoted to the crank, as described, it will be seen that the crank may be much shorter than heretofore, and the lateral movement of the pedal will at no time exceed the diameter of the arc described by the crank, while the vertical movement of the pedal will be of greater extent and depend upon the length of the lever, the pedals traveling in an orbit whose upright diameter or axis is of much greater length than its lateral diameter or axis and the forward side of such orbit being formed on a sharper curve than the rearward side, as indicated in Fig. 1 by the dotted line 12. It will also be seen by this construction that the dead-centers are passed while the pedals are rising. Hence the lever on one side is assisted to pass the dead-centers by the lever on the other side making its downward stroke, and the full downward stroke of each lever is effective, and hence the propelling power is effective on the crankshaft throughout its entire revolution. The sprocket 10 might, of course, if desired, be circular; but I prefer to employ an elliptical sprocket, because the same has many advantages which are well known, and the said advantages may be gained when it is used in connection with my invention without experiencing the disadvantages already described, and notably the rapid lateral movement of the pedal as it passes rearwardly under and comes forward over the dead-center. This advantage of my invention is evident from the fact that at such times as the minor diameter of the sprocket is in engagement with the chain and the sprocket is making its fastest movement the pedals are almost at the extremity of their stroke and are passing in almost a strictly upward or a strictly downward direction and not in a long lateral sweep, as heretofore. If desired, the pivots 9 may be elongated laterally, as shown in Fig. 2, to form foot rests or coasters, it being understood that the movement at this point is simply a slight to-and-fro movement on the arc described by the swinging support or link 5.

The advantage to be gained by using the extensions 9 as coasters is that the speed of the machine may be controlled in a considerable degree by pressing forward on them, and this may be done at such times when it would be dangerous to attempt to regain the pedals; but those elongated rests or bearings 9 being located forward of the axis of the rear wheel, it will be seen that they may perform the further and more important function of serving as mounting and dismounting steps. Such mounting-steps possess important advantages over both the prior form of step located on a fixed part of the frame and the pedal when used for mounting and dismounting purposes. In the case of the fixed step the weight of the rider has no propelling effect on the machine; but the latter must be started by a push. On the other hand, the pedal mount is difficult, especially for the novice. It produces no propelling effect excepting when the pedal is caught on the downstroke, and then the rider is liable to injury unless fully seated before the pedal has descended any considerable distance. It causes the machine to start too rapidly, and the pedal, when in the position for mounting, is too high to enable the rider to mount from the rear with the machine perfectly balanced. When mounting by the pedal on the upstroke, the momentum of the machine is considerably retarded and the mechanism severely strained. In dismounting by the pedal it must be done when the pedal is in a certain position, and this also strains the mechanism. Whereas with my steps or coasters 9, located as described, none of these objections exist. The step or extension 9 may be used for mounting or dismounting at any time irrespective of the position of the pedal, and if such step is at the rear extremity of its movement and the pedal is up when the weight is borne upon the step the effect will be to propel the machine forward with sufficient speed to preserve its equilibrium until the feet find the pedals. If the machine is given a push and the weight then brought upon the step 9, its momentum will continue irrespective of the position of the step 9 or of the pedal, inasmuch as the weight of the rider can have but comparatively little effect upon the crankshaft when applied thereto by means of the steps 9. In dismounting the steps 9 will be found to be in a more convenient position for the foot when rising from the saddle than either the pedal or prior fixed form of step, and the dismounting may be made at any time irrespective of the position of the pedal, inasmuch as the vertical movement of the step 9 is so moderate that there is no danger of its throwing the rider nor unduly increasing the speed of the machine if the weight is borne upon the step at such a time as to rotate the crank-shaft forwardly.

Having thus described my invention, what I claim as new therein, and desire to secure by Letters Patent, is—

1. In a driving mechanism for velocipedes &c., the combination with a frame, the ground wheels and a crank shaft having a crank, of a driving lever pivoted to said crank, a swinging support or link pivoted to one end of said lever and being pivotally connected to said frame, a pedal pivoted to the opposite end of said lever, and a lateral projection arranged near the juncture of said link and lever and forward of the axis of the rear wheel, whereby said projection will serve as a coaster and as a mounting and dismounting step, substantially as set forth.

2. In a driving mechanism for velocipedes &c., the combination with a frame, the ground wheels and a crank shaft having a crank, of a driving lever pivoted to said crank, a swinging support or link pivoted to one end of said lever and being pivotally connected to said frame, a pedal pivoted to said lever at one end, the opposite end of said lever being provided with the laterally elongated bearing 9 projecting from the side thereof to prevent the torsional strain on the said lever from twisting it, and said bearing 9 being arranged forward of the axis of the rear wheel, whereby said bearing may at the same time serve as a mounting step, substantially as set forth.

3. In a driving mechanism for velocipedes &c., the combination with a frame, the ground wheels and a crank shaft having a crank, of a driving lever pivoted to said crank, a swinging support or link pivoted to one end of said lever and being pivotally connected to said frame, the pedal pivoted to the side of said lever at one end, whereby the lever and the foot of the rider will move in different planes, the opposite end of said lever being provided with the laterally elongated bearing 9 projecting from the side of said lever to prevent the torsional strain on said lever from twisting it, and said bearing 9 being arranged forward of the axis of the rear ground wheel, the space between said pedal and said bearing being unobstructed, substantially as set forth.

ROBERT MIEHLE.

Witnesses:
F. A. HOPKINS,
EDNA B. JOHNSON.